US009228415B2

(12) United States Patent
Ingham et al.

(10) Patent No.: US 9,228,415 B2
(45) Date of Patent: Jan. 5, 2016

(54) MULTIDIMENSIONAL DATA REPOSITORY FOR MODELING OILFIELD OPERATIONS

(75) Inventors: Jonathan Ingham, Calgary (CA); Andrew Howell, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 845 days.

(21) Appl. No.: 12/561,288

(22) Filed: Sep. 17, 2009

(65) Prior Publication Data

US 2010/0088082 A1    Apr. 8, 2010

Related U.S. Application Data

(60) Provisional application No. 61/102,938, filed on Oct. 6, 2008.

(51) Int. Cl.
| | |
|---|---|
| *G06G 7/48* | (2006.01) |
| *G06G 7/56* | (2006.01) |
| *G06G 7/50* | (2006.01) |
| *G06F 7/00* | (2006.01) |
| *G06F 17/30* | (2006.01) |
| *E21B 41/00* | (2006.01) |
| *E21B 43/14* | (2006.01) |
| *G06Q 10/06* | (2012.01) |
| *G06F 17/10* | (2006.01) |

(52) U.S. Cl.
CPC ............... *E21B 41/00* (2013.01); *E21B 43/14* (2013.01); *G06F 17/30592* (2013.01); *G06F 17/10* (2013.01); *G06F 2217/16* (2013.01); *G06Q 10/06* (2013.01)

(58) Field of Classification Search
CPC ............... G06F 2217/16; G06F 17/10; G06F 17/30592; G06Q 10/06; E21B 43/14
USPC ..................... 703/10, 5, 9; 707/803
See application file for complete search history.

(56) References Cited

U.S. PATENT DOCUMENTS

| | | | |
|---|---|---|---|
| 4,676,313 A | 6/1987 | Rinaldi | |
| 5,412,801 A * | 5/1995 | de Remer et al. | ............... 714/20 |
| 5,992,519 A | 11/1999 | Ramakrishnan et al. | |

(Continued)

FOREIGN PATENT DOCUMENTS

| | | |
|---|---|---|
| EP | 1984860 A2 | 10/2008 |
| GB | 2336008 A | 10/1999 |

(Continued)

OTHER PUBLICATIONS

Steve Balough, "Managing Oilfied Data Management", 1994.*

(Continued)

*Primary Examiner* — Omar Fernandez Rivas
*Assistant Examiner* — Angel Calle
(74) *Attorney, Agent, or Firm* — Alec J. McGinn

(57) ABSTRACT

A method for performing oilfield operations including collecting a model data set from the oilfield for populating a location of a plurality of locations in a multidimensional data repository, the plurality of locations accessible based on a plurality of dimensions of the multidimensional data repository, performing, using a processor of a computer, analysis of at least the model data set retrieved from the location of the plurality of locations to generate a result, adjusting, using the processor, the multidimensional data repository based on the result, and adjusting the oilfield operations based on the multidimensional data repository.

25 Claims, 8 Drawing Sheets

(56) References Cited

U.S. PATENT DOCUMENTS

| | | | |
|---|---|---|---|
| 6,012,015 | A | 1/2000 | Tubel |
| 6,018,497 | A | 1/2000 | Gunasekera |
| 6,078,869 | A | 6/2000 | Gunasekera |
| 6,106,561 | A | 8/2000 | Farmer |
| 6,178,815 | B1 | 1/2001 | Felling et al. |
| 6,230,101 | B1 | 5/2001 | Wallis |
| 6,266,619 | B1 | 7/2001 | Thomas et al. |
| 6,313,837 | B1 | 11/2001 | Assa et al. |
| 6,356,844 | B2 | 3/2002 | Thomas et al. |
| 6,775,578 | B2 | 8/2004 | Couet et al. |
| 6,832,159 | B2 | 12/2004 | Smits et al. |
| 6,836,731 | B1 | 12/2004 | Whalley et al. |
| 6,853,921 | B2 | 2/2005 | Thomas et al. |
| 6,892,812 | B2 | 5/2005 | Niedermayr et al. |
| 6,931,621 | B2 | 8/2005 | Green et al. |
| 6,937,621 | B2 | 8/2005 | Samrao et al. |
| 6,980,940 | B1 | 12/2005 | Gurpinar et al. |
| 7,079,952 | B2 | 7/2006 | Thomas et al. |
| 7,107,188 | B2 | 9/2006 | Veneruso et al. |
| 7,164,990 | B2 | 1/2007 | Bratvedt et al. |
| 7,172,037 | B2 | 2/2007 | Dashevskiy et al. |
| 7,248,259 | B2 | 7/2007 | Fremming |
| 7,512,543 | B2 | 3/2009 | Raghuraman et al. |
| 7,752,023 | B2 | 7/2010 | Middya |
| 8,103,493 | B2 | 1/2012 | Sagert et al. |
| 8,140,310 | B2 * | 3/2012 | Fitzpatrick et al. ............ 703/10 |
| 8,209,687 | B2 * | 6/2012 | Yuyitung et al. ................... 718/1 |
| 8,352,227 | B2 | 1/2013 | Klumpen et al. |
| 2002/0013687 | A1 | 1/2002 | Ortoleva |
| 2002/0188537 | A1 | 12/2002 | Leeds et al. |
| 2003/0132934 | A1 | 7/2003 | Fremming |
| 2003/0155111 | A1 | 8/2003 | Vinegar et al. |
| 2003/0216897 | A1 | 11/2003 | Endres et al. |
| 2003/0225606 | A1 | 12/2003 | Raghuraman et al. |
| 2004/0015295 | A1 | 1/2004 | Bratvedt et al. |
| 2004/0133290 | A1 | 7/2004 | Nobel et al. |
| 2004/0148147 | A1 | 7/2004 | Martin |
| 2004/0220790 | A1 | 11/2004 | Cullick et al. |
| 2004/0220846 | A1 | 11/2004 | Cullick et al. |
| 2004/0268338 | A1 * | 12/2004 | Gurpinar et al. ............ 717/169 |
| 2005/0114031 | A1 | 5/2005 | Michael Thambynayagam et al. |
| 2005/0119911 | A1 * | 6/2005 | Ayan et al. ......... 705/1 |
| 2005/0122001 | A1 | 6/2005 | Ma et al. |
| 2005/0149307 | A1 | 7/2005 | Gurpinar et al. |
| 2006/0129366 | A1 | 6/2006 | Shaw |
| 2006/0184329 | A1 | 8/2006 | Rowan et al. |
| 2006/0197759 | A1 | 9/2006 | Fremming |
| 2007/0061087 | A1 | 3/2007 | Ghorayeb et al. |
| 2007/0112547 | A1 | 5/2007 | Ghorayeb et al. |
| 2007/0168169 | A1 | 7/2007 | Neave |
| 2007/0179767 | A1 | 8/2007 | Cullick et al. |
| 2007/0198223 | A1 | 8/2007 | Ella et al. |
| 2007/0272407 | A1 | 11/2007 | Lehman et al. |
| 2008/0133550 | A1 | 6/2008 | Orangi et al. |
| 2008/0140369 | A1 | 6/2008 | Rashid et al. |
| 2008/0221949 | A1 * | 9/2008 | Delurgio et al. ................. 705/7 |
| 2008/0235280 | A1 | 9/2008 | Schoen et al. |
| 2008/0243749 | A1 | 10/2008 | Pepper et al. |
| 2008/0262802 | A1 | 10/2008 | Halabe et al. |
| 2009/0012765 | A1 | 1/2009 | Raphael |
| 2009/0018996 | A1 * | 1/2009 | Hunt et al. ......... 707/2 |
| 2009/0216508 | A1 | 8/2009 | Dale et al. |
| 2010/0057418 | A1 | 3/2010 | Li et al. |
| 2010/0306281 | A1 * | 12/2010 | Williamson ............... 707/803 |

FOREIGN PATENT DOCUMENTS

| | | | |
|---|---|---|---|
| WO | 99/64896 | A1 | 12/1999 |
| WO | 2004/049216 | A1 | 6/2004 |
| WO | 2004046503 | A1 | 6/2004 |
| WO | 2005122001 | A1 | 12/2005 |
| WO | 2007089829 | A2 | 8/2007 |
| WO | WO2008089345 | | 7/2008 |
| WO | 2009006526 | A2 | 1/2009 |

OTHER PUBLICATIONS

Owoola, "A prototype environmental data management GIS for shell petroleum development company of nigeria limited", 2002.*
Shastri L Nimmagadda, NPL publication, "Data warehouse Structuring Methodologies for Efficient Mining of Western Australian Petroleum Data Sources", IEEE 2005.*
Landmark Graphics Corporation, DecisionSpace Production, H04881, Mar. 2006.
Schlumberger, Petrel, Enhance Precision Geosteering and Decision making with Real-Time 3D modeling Using Petrel Workflow Tools, May 2005.
Landmark Graphics Corporation, DecisionSpace Nexus, 2005.
Bechtold, B., Discovery on OpenWorks Software Enables Direct Access to Existng OpenWorks Projects Using Windows-Based Tools, Feb. 2006.
International Search Report for International Application No. PCT/US2007/083070, dated Apr. 22, 2008, 3 pages.
Paradigm, Paradigm Announces Geolog Version 6.6 (Press Release), Amsterdam, Netherlands, Jun. 20, 2005.
Halliburton, Dynamic Asset Modeling, 2006.
Written Opinion for International Application No. PCT/US2007/083070, dated Apr. 22, 2008, 4 pages.
VoxelGeo, Volume-Based Seismic Interpretation, 2005.
GeoGraphix, Aries System, 2006.
International Search Report for International Application No. PCT/US2007/083072, dated Apr. 14, 2008, pp. 1-3.
Flagship Geoscience, L.L.C., Stragmagic as a Reservoir Characterization Tool, A Case Study in the Caddo & Vineyard Formations, Sep. 1998.
Petroleum Experts Ltd., IPM-GAP, Prosper, MBAS, PVTP, Reveal, Resolve-Engineeing Software Development, Manual, 2004.
Written Opinion for International Application No. PCT/US2007/083072, dated Apr. 14, 2008, p. 1-5.
Roxar Launched IRAP RMS Uncertainty Management, Stravenger, Norway, Nov. 27, 2006.
Wickens, L.M. et al, "Increasing Confidence in Production Forecasting Through Risk-based Integrated Asset Modelling, Captain Field Case Study," SPE International, SPE Europe/EAGE Annual Conference and Exhibition, Jun. 12-15, 2006, pp. 1-12, SPE 99937, Vienna, Austria.
Tobias, Steve et al., "Integrated Workflow Methodologies for Asset Teams," SPE International, SPE Asia Pacific Conference on Integrated Modelling for Asset Management, SPE International, Mar. 23-24, 1998, pp. 1-4, SPE 39736, Kuala Lumpur, Malaysia.
Sutjahjo, Andreas et al., "A Case Study: Maximizing Asset Value Through Integrated Pipeline & Compression Optimization," SPE International, SPE Asia Pacific Conference on Integrated Modelling for Asset Management, Mar. 29-30, 2004, pp. 1-9, SPE 87040, Kuala Lumpur, Malaysia.
Howell, A. et al., "From Reservoir Through Process, From Today to Tomorrow—The Integrated Asset Model," SPE International, SPE Intelligent Energy Conference and Exhibition, Apr. 11-13, 2006, pp. 1-20, SPE 99469, Amsterdam, The Netherlands.
Luciawaty, Mery et. al, "Integrated Asset Modeling, A Quick Solution for Identifying an Infill Well Opportunity," SPE International, SPE Asia Pacific Oil and Gas Conference and Exhibition, Oct. 18-20, 2004, pp. 1-7, SPE 88600, Perth, Australia.
Acosta, L.M. et al., "Integrated Modeling of the El Furrial Field Asset Applying Risk and Uncertainty Analysis for the Decision Making," SPE International, SPE Europe/EAGE Annual Conference, Jun. 13-16, 2005, pp. 1-5, SPE 94093, Madrid, Spain.
Rosales, A. et al., "Future Exploitation Strategy Using Integrated Subsurface-to-Surface Methodology: Field Case Study-Litoral De Tabasco Asset," SPE International, First International Oil Conference and Exhibition, Aug. 31-Sep. 2, 2006, pp. 1-15, SPE 104032, Cancun, Mexico.
Schott, David W. et al, "Case History of Using an Integrated Asset Model for Depletion Planning of a Tight Gas Reservoir, Northeast Thompsonville Field, Jim Hogg and Webb Counties, Texas," SPE International, SPE Annual Technical Conference and Exhibition, Sep. 26-29, 2004, pp. 1-9, SPE 90519, Houston, Texas USA.

(56) References Cited

OTHER PUBLICATIONS

El-Banbi, Ahmed H. et al., "An Integrated Approach to Optimizing a Large Asset," SPE International, SPE Annual Technical Conference and Exhibition, Sep. 29-Oct. 2, 2002, pp. 1-8, SPE 77674, San Antonio, Texas USA.
Liao, T.T. et al., "Development and Applications of the Sustaining Integrated-Asset-Modeling Tool," SPE Production & Operations, Abu Dhabi International Conference and Exhibition, Oct. 10-13, 2004, pp. 13-19, SPE 88748, Abu Dhabi, United Arab Emirates.
Narayanan, Keshav et al., "Better Field Development Decisions from Multi-Scenario, Interdependent Reservoir, Well, and Facility Simulations," SPE International, SPE Reservoir Simulation Symposium, Feb. 3-5, 2003, pp. 1-11, SPE 79703, Houston, Texas USA.
Search and Examination Report completed on Apr. 6, 2013 by the Australian Patent Office for GC Application No. GCC/P/2009/14427, filed on Oct. 4, 2009, 9 pages.
Examiner's Report mailed Apr. 11, 2013 for Canadian Patent Application No. 2,680,719, 3 pages.
Schlumberger, Avocet Integrated Asset Modeler, 2005.
Hegstad, B.K. et al., "Rapid Scenario and Risk Analysis for a Complex Gas Field With Large Uncertainties," SPE International, SPE Annual Technical Conference and Exhibition, Sep. 26-29, pp. 1-11, SPE 90961, Houston, Texas USA, 2004.
Begg, S.H. et al., "Improving Investment Decisions Using a Stochastic Integrated Asset Model," SPE International, SPE Annual Technical Conference and Exhibition, Sep. 30-Oct. 3, 2001, pp. 1-16, SPE 71414, New Orleans, Louisiana USA.
Ghorayeb, K. et al., "Field Planning Using Integrated Surface/Subsurface Modeling," SPE International, SPE Middle East Oil & Gas Show and Conference, Mar. 12-15, 2005, pp. 1-9, SPE 92381, Bahrain.
Luiao, Tony Tianlu et al., "Evaluating Operation Strategies via Integrated Asset Modeling," SPE International, SPE Gas Technology Symposium, Apr. 30-May 2, 2002, pp. 1-10, SPE 75525, Calgary, Alberta, Canada.
Crerar, A. et al., "Uncertainty and Value in Integrated Asset Modelling," SPE International, Offshore Europe 2005, Sep. 6-9, 2005, pp. 1-8, SPE 96636, Aberdeen, Scotland, UK.
Tjahyadi, Riza et al., "KLX/KLY Reservoir Management Using Integrated Asset Modeling, Case Study," SPE International, SPE Asia Pacific Oil and Gas Conference and Exhibition, Oct. 18-20, 2004, pp. 1-5, SPE 88602, Perth, Australia.
Guyaguler, Baris et al., "Integrated Optimization of Field Development, Planning, and Operation," SPE International, SPE Annual Technical Conference and Exhibition, Sep. 24-27, 2006, pp. 1-13, SPE 102557, San Antonio, Texas USA.
Soma, Ramakrishna et al., "A Service Oriented Data Composition Architecture for Integrated Asset Management," SPE International, SPE Intelligent Energy Conference and Exhibition, Apr. 11-13, 2006, pp. 1-8, SPE 99983, Amsterdam, The Netherlands.
Janele, P.T. et al., "Integrated Asset Management: Work Process and Data Flow Models," SPE International, SPE Asia Pacific Conference on Integrated Modeling for Asset Management, Mar. 23-24, 1998, pp. 1-11, SPE 39712, Kuala Lumpur, Malaysia.
Kozman, Jess B., "Why Can't I Just Start with a Map?"—Case Histories for Integrated Asset Management, SPE International, SPE Asia Pacific Conference on Integrated Modeling for Asset Management, Mar. 29-30, 2004, pp. 1-7, SPE 87022, Kuala Lumpur, Malaysia.
Ghorayeb, Kassem et al., "A General Purpose Controller for Coupling Multiple Reservoir Simulations and Surface Facility Networks," SPE International, SPE Reservoir Simulation Symposium, Feb. 3-5, 2003, pp. 1-15, SPE 79702, Houston, Texas USA.
Barroux, et al., "Linking Reservoir and Surface Simulators. How to Improve the Coupled Solutions", SPE 65159, 2000, pp. 1-14.
Bieker, et al., "Real Time Production Optimization of Offshore Oil and Gas Production Systems: A Technology Survey", SPE 99446—Intelligent Energy Conference and Exhibition, Amsterdam, The Netherlands, Apr. 2006, 8 pages.
Hayder, et al., "Production Optimization Through Coupled Facility/Reservoir Simulation", SPE 100027—Intelligent Energy Conference and Exhibition, Amsterdam, The Netherlands, 2006, pp. 1-6.
Hepguler, et al., "Integration of a Field Surface and Production Network with a Reservoir Simulator", SPE 38937—SPE Computer Applications vol. 9, No. 3, 1997, pp. 88-93.
Lo, et al., "WAG Pilot Design and Observation Well Data Analysis for Hassi Berkine South Field", SPE 84076—SPE Annual Technical Conference and Exhibition, Denver, Colorado, Oct. 5-8, 2003, pp. 1-15.
Schiozer, "Simultaneous Simulation of Reservoir and Surface Facilities", Stanford University, 1994, pp. 1-172.
Zapata, et al., "Advances in Tightly Coupled Reservoir\Wellbore/Surface-Network Simulation", SPE 71120—SPE Reservoir Evaluation & Engineering, vol. 4, No. 2, 2001, pp. 114-120.
Zhang, et al., "Model-Based Framework for Oil Production Forecasting and Optimization: A Case Study in Integrated Asset Management", SPE 99979—SPE Intelligent Energy Conference and Exhibition, Apr. 11-13, 2006, pp. 1-7.
Office Action issued in CA2680719 on Jan. 3, 2014, 2 pages.
Office Action issued in CA2680719 on Aug. 8, 2011, 2 pages.
Combined Search and Examination Report issued in GCC/P/2009/14427 on Apr. 15, 2013, 9 pages.
Office Action issued in MX/A/2009/010537 on Mar. 8, 2013, 3 pages.
Bangerth, et al., "An autonomic reservoir framework for the stochastic optimization of well placement", Cluster Computing, vol. 8, Oct. 2005, pp. 255-269.
Coats, et al., "A generalized wellbore and surface facility model, fully coupled to a reservoir simulator", SPE 87913—SPE Reservoir Evaluation & Engineering vol. 7, No. 2, 2004, pp. 132-142.
Fanchi, "Principles of Applied Reservoir Simulation, Second Edition", Elsevier Gulf, 2001, pp. 90-91, 117-140, 142-155, 310-331.
Kosmala, et al., "Coupling of a surface network with reservoir simulation", SPE 84220—SPE Annual Technical Conference and Exhibition, Oct. 5-8, Denver, Colorado, 2003, pp. 1-11.
OI, "Aspen HYSYS simulation of $CO_2$ removal by amine absorption from a gas based power plant", SIMS Conference, Oct. 30, 2007, pp. 73-81.
Oldenburg, et al., "$CO_2$ injection for enhanced gas production and carbon sequestration", SPE 74367—Society of Petroleum Engineers, 2002, pp. 1-10.
Oldenburg, et al., "Economic feasibility of carbon sequestration with enhanced gas recovery (CSEGR)", Energy, vol. 29, 2004, pp. 1413-1422.
Oldenburg, et al., "Process modeling of $CO_2$ injection into natural gas reservoirs for carbon sequestriation and enhanced gas recovery", Energy & Fuels, vol. 15, 2001, pp. 293-298.
Sagli, et al., "Improved Production and Process Optimization Through People, Technology, and Process", SPE 110655—SPE Annual Technical Conference and Exhibition, Nov. 11-14, 2007, Anaheim, CA, 7 pages.
Sengul, "$CO_2$ EOR Perspective for Carbonate Reservoirs", Schlumberger Carbon Services MEA, 2007, pp. 1-43.
Singh, et al., "Techno-economic study of $CO_2$ capture from an existing coal-fired power plant: MEA scrubbing vs. $O_2/CO_2$ recycle combustion", Energy Conversion and Management, vol. 44, 2003, pp. 3073-3091.
Stauffer, et al., "A System Model for Geologic Sequestration of Carbon Dioxide", Environmental Science and Technology, vol. 43, No. 3, 2009, pp. 565-570.
Trick, "A Different Approach to Coupling a Reservoir Simulator with a Surface Facilities Model", SPE 40001—SPE Gas Technology Symposium, Mar. 15-18, 1998, Calgary, Alberta, Canada, pp. 285-290.
Viswanathan, et al., "Development of a hybrid process and system model for the assessment of wellbore leakage at a geologic $CO_2$ sequestration site", Environmental Science & Technology, vol. 42, No. 19, Aug. 21, 2008, pp. 7280-7286.
Watson, et al., "Integrated Flow-Assurance Modeling of the BP Angola Block 18 Western Area Development", SPE 101826—SPE Projects, Facilities & Construction, vol. 2, No. 2, Jun. 2007, pp. 1-12.
Zhang, et al., "System-level modeling for economic evaluation of geological $CO_2$ storage in gas reservoirs", Energy Conversion and Management, vol. 48, 2007, pp. 1827-1833.
Zhang, et al., "System-level modeling for geological storage of $CO_2$", Proceeding TOUCH Symposium, 2006, pp. 1-6.

\* cited by examiner

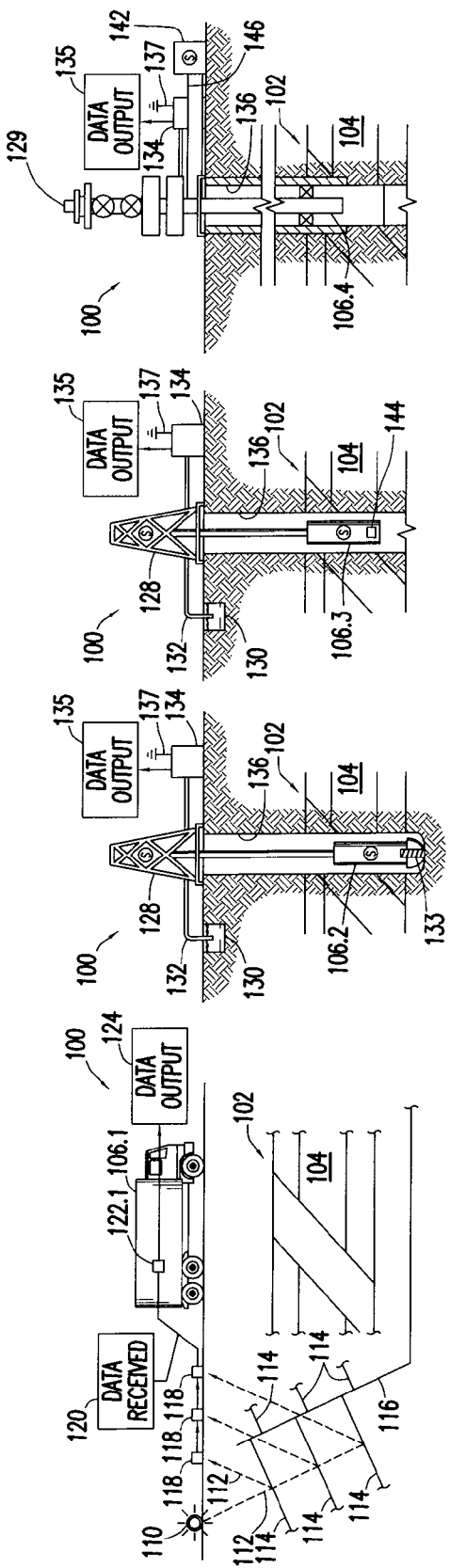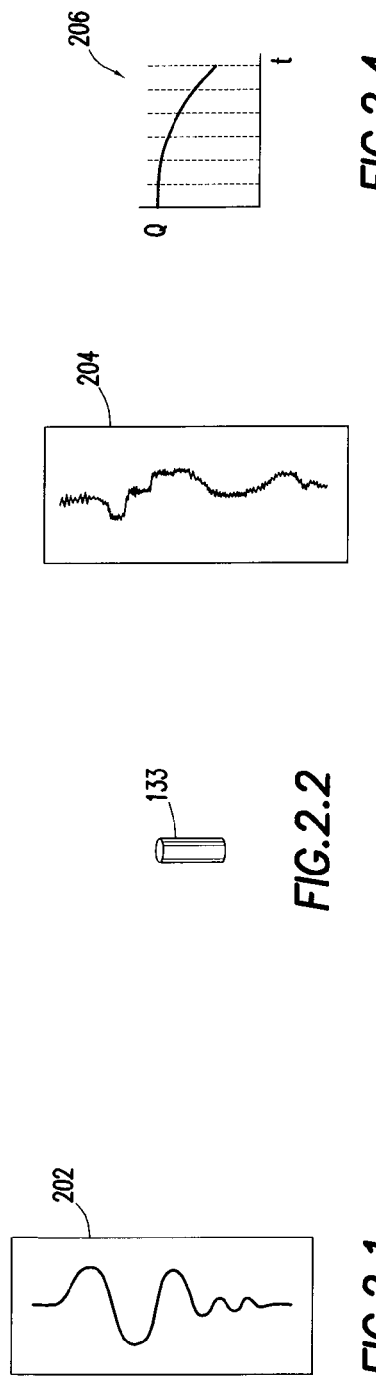

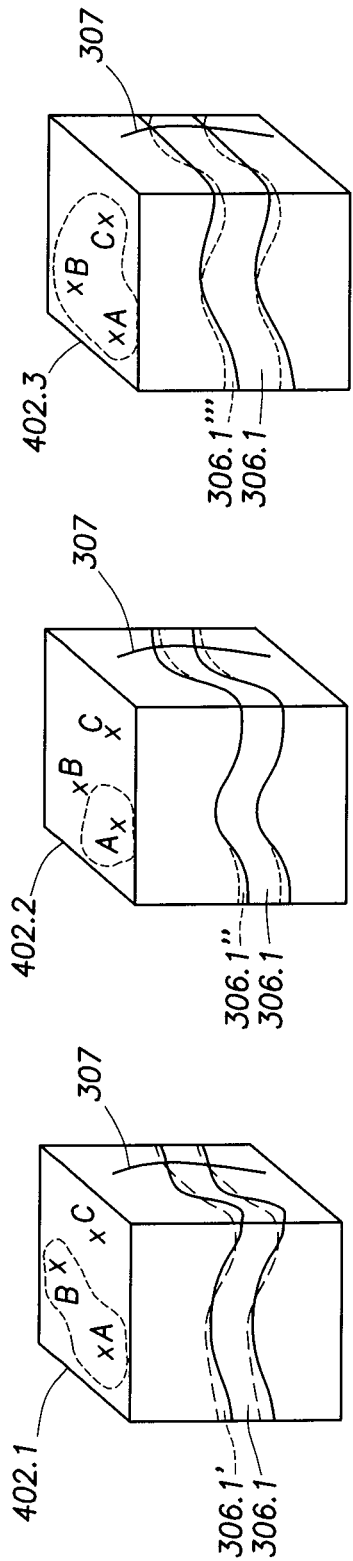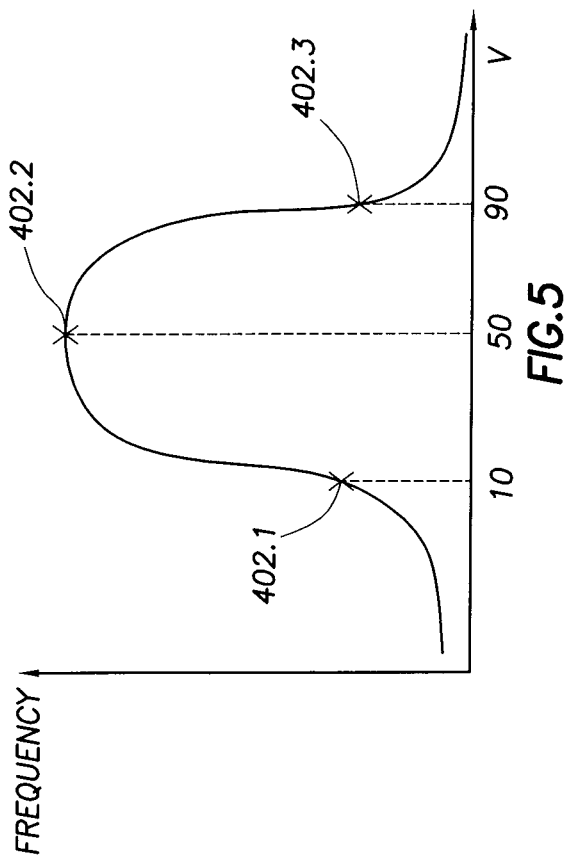

MULTIDIMENSIONAL DATA REPOSITORY FOR MODELING OILFIELD OPERATIONS

CROSS-REFERENCE TO RELATED APPLICATIONS

This Application claims priority under 35 U.S.C. §119(e) to Provisional Patent Application No. 61/102,938, filed Oct. 6, 2008, entitled "METHOD AND SYSTEM FOR PERFORMING OILFIELD OPERATIONS," which is incorporated herein by reference in its entirety. Subject matter contained herein may be related to subject matter contained in U.S. patent application Ser. No. 11/929,921, entitled "System and Method For Performing Oilfield Simulation Operations," filed on Oct. 30, 2007, which is incorporated herein by reference in its entirety. Subject matter contained herein may be related to subject matter contained in U.S. patent application Ser. No. 60/995,840, entitled "System and Method For Performing Oilfield Operations," which is incorporated herein by reference in its entirety.

BACKGROUND

Oilfield operations, such as surveying, drilling, wireline testing, completions, production, planning and oilfield analysis, are typically performed to locate and gather valuable downhole fluids. During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

The data may be used to predict downhole conditions, and make decisions concerning oilfield operations. Such decisions may involve well planning, well targeting, well completions, operating levels, production rates, and other operations and/or operating parameters. Often this information is used to determine when to drill new wells, re-complete existing wells or alter wellbore production. Oilfield conditions, such as geological, geophysical and reservoir engineering characteristics, may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores, or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating parameters may be adjusted as oilfield conditions change and new information is received.

SUMMARY

In general, in one aspect, a multidimensional data repository for modeling oilfield operations relates to a method for performing oilfield operations including collecting a model data set from the oilfield for populating a location of a plurality of locations in a multidimensional data repository, the plurality of locations accessible based on a plurality of dimensions of the multidimensional data repository, performing, using a processor of a computer, analysis of at least the model data set retrieved from the location of the plurality of locations to generate a result, adjusting, using the processor, the multidimensional data repository based on the result, and adjusting the oilfield operations based on the multidimensional data repository.

Other aspects of a multidimensional data repository for modeling oilfield operations will be apparent from the following description and the appended claims.

BRIEF DESCRIPTION OF THE DRAWINGS

So that the above described features of a multidimensional data repository for modeling oilfield operations (hereinafter referred to as "multidimensional data repository") can be understood in detail, a more particular description, briefly summarized above, may be had by reference to the embodiments thereof that are illustrated in the appended drawings. It is to be noted, however, that the appended drawings illustrate typical embodiments of this multidimensional data repository and are therefore not to be considered limiting of its scope, for a multidimensional data repository may admit to other equally effective embodiments.

FIGS. 1.1-1.4 depict a schematic view of an oilfield having subterranean structures containing reservoirs therein, in which embodiments of the fully coupled oilfield simulation can be implemented.

FIGS. 2.1-2.4 depict graphical depictions of data collected by the tools of FIGS. 1.1-1.4, respectively.

FIGS. 4.1-4.3 depict schematic, 3D views of the static models based on the data acquired by the data acquisition tools of FIG. 3.

FIG. 5 depicts a graphical representation of a probability plot of static models of FIG. 4.

DETAILED DESCRIPTION

Figure 3:
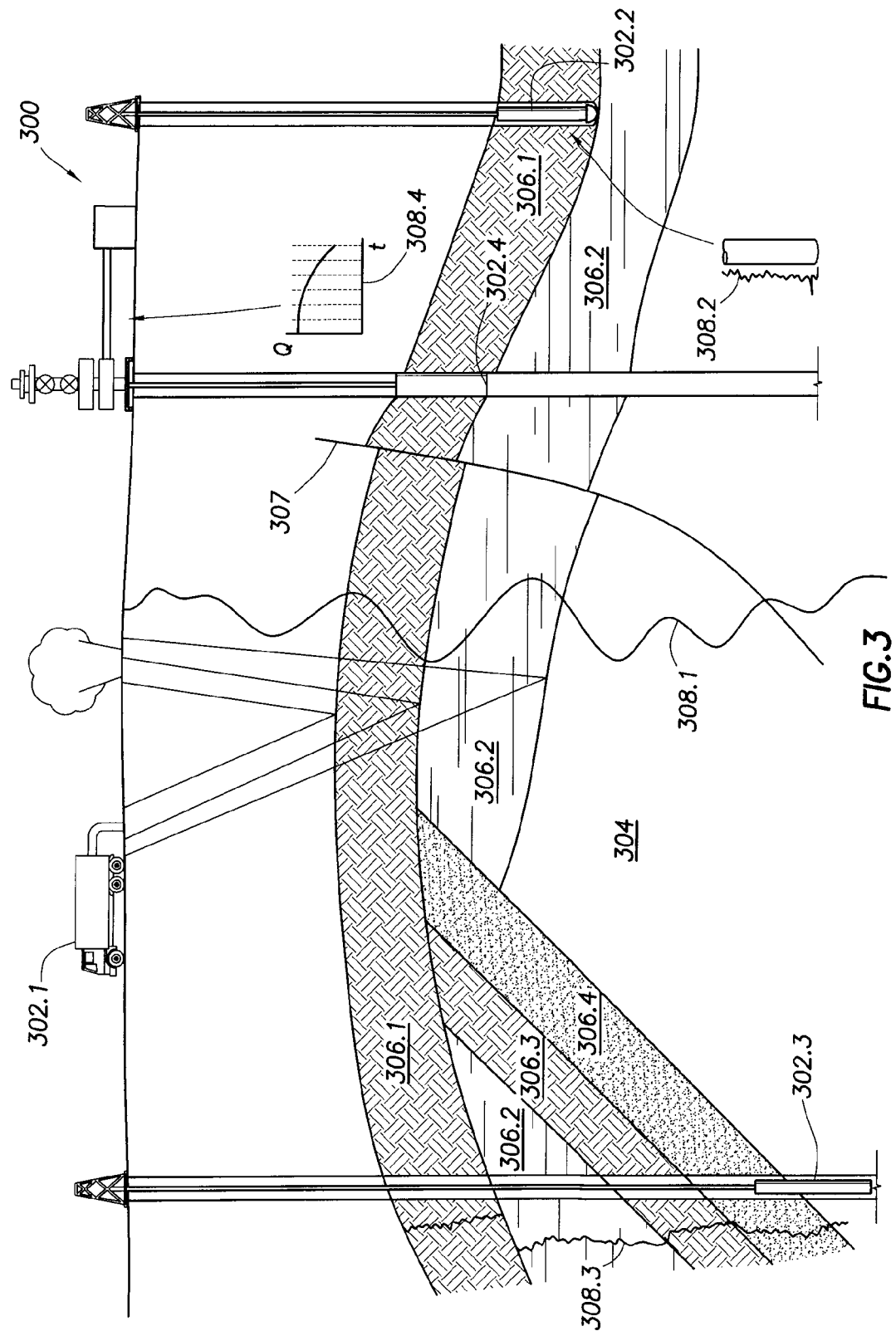
FIG. 3 depicts a schematic view, partially in cross section of an oilfield having a plurality of data acquisition tools positioned at various locations along the oilfield for collecting data from the subterranean formations.

Embodiments of the invention are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

In general, embodiments of the invention provides capabilities for (i) performing analysis responsive to a query using the model data sets stored in a multidimensional data repository, (ii) revising the model data set by using either external or internal simulators, (iii) substituting model data set generated from external detail simulators (e.g., to model the reservoir or the gathering system fluid dynamics) by proxy models and vice-versa, (iv) integrating and interoperating the detailed model and proxy model, (v) performing optimization using the models, (vi) performing uncertainty analysis quickly to generate probabilistic estimates, (vii) disabling uncertainty analysis for go/no go economic calculation, (viii) performing course of action analysis using the proxy models, (ix) performing sensitivity analysis and assessing the impact from scheduling, and (x) archiving the decision making process and facilitating cross discipline collaboration and peer/management review.

FIGS. 1.1-1.4 show a schematic view of an oilfield having subterranean structures containing reservoirs therein, with various oilfield operations being performed on the oilfield.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking resistivity measurements or a core sample (133).

As shown in FIG. 1.2, the surface unit (134) is used to communicate with the drilling tools (106.2) and/or offsite operations. The surface unit (134) is capable of communicating with the drilling tools (106.2) to send commands to the drilling tools (106.2) and to receive data therefrom. The surface unit (134) may be provided with computer facilities for receiving, storing, processing, and/or analyzing data from the oilfield (100). The surface unit (134) collects data generated during the drilling operation and produces data output (135) which may be stored or transmitted. Computer facilities, such as those of the surface unit (134), may be positioned at various locations about the oilfield (100) and/or at remote locations.

Sensors (S), such as gauges, may be positioned about the oilfield to collect data relating to various oilfields operations as described previously As shown, the sensor (S) is positioned in one or more locations in the drilling tools (106.2) and/or at the rig (128) to measure drilling parameters, such as weight on bit, torque on bit, pressures, temperatures, flow rates, compositions, rotary speed and/or other parameters of the oilfield operation. Sensor (S) may also be positioned in one or more locations in the circulating system.

The data gathered by the sensors (S) may be collected by the surface unit (134) and/or other data collection sources for analysis or other processing. The data collected by the sensors (S) may be used alone or in combination with other data. The data may be collected in one or more databases and/or transmitted onsite or offsite. Portions of the data may be selectively used for analyzing and/or predicting oilfield operations of the current and/or other wellbores. The data may historical data, real time data, or combinations thereof. The real time data may be used in real time, or stored for later use. The data may also be combined with historical data or other inputs for further analysis. The data may be stored in separate databases or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the oilfield (100), or connected remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally connected to one or more controllers for actuating mechanisms at the oilfield (100). The surface unit (134) may then send command signals to the oilfield (100) in response to data received. The surface unit (134) may receive commands via the transceiver or may itself execute commands to the controller. A processor (not shown) may be provided to analyze the data (locally or remotely) and make the decisions and/or actuate the controller. In this manner, the oilfield (100) may be selectively adjusted based on the data collected. This technique may be used to optimize portions of the oilfield operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 1.3 depicts a wireline operation and includes the elements depicted in FIG. 1.2 except that the drilling tool (106.2) is substituted with a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or christmas tree (129) and into the completed wellbore (136) of FIG. 1.3 for drawing fluid from the downhole reservoirs into the surface facilities (142). Fluid flows from reservoir (104) through perforations in the casing (not shown) and into the production tool (106.4) in the wellbore (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106.4) or associated equipment, such as the christmas tree (129), gathering network (146), surface facilities (142) and/or the production facility, to measure fluid parameters, such as fluid composition, flow rates, pressures, temperatures, and/or other parameters of the production operation.

While simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1.2-1.4 depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation (102) and/or its geological formations may be used. Various sensors (S) may be located at various positions along the wellbore and/or the monitoring tools to collect and/or monitor the desired data. Other sources of data may also be provided from offsite locations.

The oilfield configuration in FIGS. 1.1-1.4 are intended to provide a brief description of an example of an oilfield usable with a multidimensional data repository. Part, or all, of the oilfield (100) may be on land and/or sea. Also, while a single oilfield measured at a single location is depicted, a multidimensional data repository may be used with any combination of one or more oilfields (100), one or more processing facilities, and one or more wellsites.

FIGS. 2.1-2.4 are graphical depictions of examples of data collected by the tools of FIGS. 1.1-1.4, respectively. FIG. 2.1 depicts a seismic trace (202) of the subterranean formation of FIG. 1.1 taken by seismic truck (106.1). The seismic trace may be used to provide data, such as a two-way response over a period of time. FIG. 2.2 depicts a core sample (133) taken by the drilling tools (106.2). The core sample (133) may be used to provide data, such as a graph of the density, porosity, permeability or other physical property of the core sample (133) over the length of the core. Tests for density and viscosity may be performed on the fluids in the core at varying pressures and temperatures. FIG. 2.3 depicts a well log (204) of the subterranean formation (102) of FIG. 1.3 taken by the wireline tool (106.3). The wireline log typically provides a resistivity or other measurement of the formations at various depths. FIG. 2.4 depicts a production decline curve or graph (206) of fluid flowing through the subterranean formation (102) of FIG. 1.4 measured at the surface facilities (142). The production decline curve (206) typically provides the production rate (Q) as a function of time (t)

The respective graphs of FIGS. 2.1-2.3 depict examples of static measurements that may describe information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2.4 depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

FIG. 3 depicts a schematic view, partially in cross section, of an oilfield (300) having data acquisition tools (302.1), (302.2), (302.3), and (302.4) positioned at various locations along the oilfield for collecting data of a subterranean formation (304). The data acquisition tools (302.1-302.4) may be the same as data acquisition tools (106.1-106.4) of FIGS. 1.1-1.4, respectively, or others not depicted. As shown, the data acquisition tools (302.1-302.4) generate data plots or measurements (308.1-308.4), respectively. These data plots are depicted along the oilfield to demonstrate the data generated by various operations.

Data plots (308.1-308.3) are examples of static data plots that may be generated by the data acquisition tools (302.1-302.4), respectively. Static data plot (308.1) is a seismic two-way response time and may be the same as the seismic trace (202) of FIG. 2.1. Static plot (308.2) is core sample data measured from a core sample of the formation (304), similar to the core sample (133) of FIG. 2.2. Static data plot (308.3) is a logging trace, similar to the well log(204) of FIG. 2.3. Production decline curve or graph (308.4) is a dynamic data plot of the fluid flow rate over time, similar to the graph (206) of FIG. 2.4. Other data may also be collected, such as historical data, user inputs, economic information, and/or other measurement data and other parameters of interest.

The subterranean formation (304) has a plurality of geological formations (306.1-306.4). As shown, the structure has several formations or layers, including a shale layer (306.1), a carbonate layer (306.2), a shale layer (306.3), and a sand layer (306.4). A fault line (307) extends through the layers (306.1, 306.2). The static data acquisition tools may be adapted to take measurements and detect the characteristics of the formations.

While a specific subterranean formation (304) with specific geological structures are depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools (302.1-302.4) of FIG. 3, may then be processed and/or evaluated. Typically, seismic data displayed in the static data plot (308.1) from the data acquisition tool (302.1) is used by a geophysicist to determine characteristics of the subterranean formations (304) and features. Core data shown in static plot (308.2) and/or log data from the well log(308.3) is typically used by a geologist to determine various characteristics of the subterranean formation (304). Production data from the graph (308.4) is typically used by the reservoir engineer to determine fluid flow reservoir characteristics. The data analyzed by the geologist, geophysicist, and the reservoir engineer may be analyzed using modeling techniques.

FIG. 4.1-4.3 depict three-dimensional graphical representations of the subsurface referred to as a static model in accordance with one or more embodiments. The static model may be generated based on one or more of the models generated from, for example, the data gathered using acquisition tools (302.1-302.4). In the figures provided, the static models (402.1-402.3) are generated by the data acquisition tools (302.1-302.3) of FIG. 3, respectively. These static models may provide a bi-dimensional view of the subterranean formation, based on the data collected at the given location.

The static models may have different accuracies based on the types of measurements available, quality of data, location and other factors. While the static models of FIGS. 4.1-4.3 are taken using certain data acquisition tools at a single location of the oilfield, one or more of the same or different data acquisition tools may be used to take measurements at one or more locations throughout the oilfield to generate a variety of models. Various analysis and modeling techniques may be selected depending on the desired data type and/or location.

Each of the static models (402.1-402.3) is depicted as volumetric representations of an oilfield with one or more reservoirs, and the surrounding formation structures. These volumetric representations are a prediction of the geological structure of the subterranean formation at the specified location based upon available measurements. For example, the representations are probable scenarios, created using the same input data (historical and/or real time), but having differing interpretation, interpolation, and modeling techniques. As shown, the models contain geological layers within the subterranean formation. In particular, fault (307) of FIG. 3 extends through each of the models. Each static model also has reference points A, B, and C located at specific positions along each of the static models. These static models and the specific reference points of the static models may be analyzed. For example, a comparison of the different static models may show differences in the structure of fault (307) and the adjacent layer. Each of the reference points may assist in the comparison between the various static models. Adjustments may be made to the models based on an analysis of the various static models in FIGS. 4.1-4.3, and an adjusted formation layer may be generated as is described further below.

FIG. 5 depicts graphical representation of a probability plot of multiple static models, such as the models (402.1-402.3) of FIGS. 4.1-4.3. The graph depicts a range of reservoir attribute value (V), such as volumetrics, production rate, gross rock thickness, net pay, cumulative production, etc. The value of the reservoir attribute value. (V) can vary due to any static or dynamic component(s) being assessed, such as structure, porosity, permeability, fluid contact levels, etc. The variables are typically constrained in the modeling exercise to be within reasonable predictions of what the real reservoir(s) are capable of, or what has been observed in similar reservoirs. This graph is a histogram showing multiple model realizations that may be generated by the provided data. The variable results may be generated by varying multiple model parameters. The graph may then be generated by reviewing and estimating the probability of the models generated and plotting them.

As shown, various model realizations that make up the distribution graph are equally probable in geological terms. The histogram indicates that static model (402.1) provides a ninety percent probability of having at least that amount of reservoir attribute value (V). The histogram as shown also indicates that static model (402.2) has a fifty percent probability of having at least that amount of reservoir attribute value (V), and static model (402.3) a ten percent probability of having this higher amount. This graph suggests that static model (402.3) is the more optimistic model estimate of reservoir attribute value (V). The static models and their associated likelihoods may be used, for example, in determining field development plans and surface facility production schemes. Combinations of static model representations, for example (402.1) through (402.3), are considered and analyzed to assess the risk and/or economic tolerance of field development plans. This, in turn, may provide a key input into the estimate of economically recoverable reserves from a field, a well or a reservoir.

Referring back to the static models of FIGS. 4.1-4.3, the models have been adjusted based on the dynamic data provided in the production of the graph (308.4) of FIG. 3. The dynamic data either collected by data acquisition tool (302.4) or predicted using modeling techniques, is applied to each of the static models (402.1-402.3). As shown, the dynamic data indicates that the fault (307) and layer (306.1) as predicted by the static models may need adjustment. The layer (306.1) has been adjusted in each model as shown by the dotted lines. The modified layer is depicted as (306.1'), (306.1") and (306.1''') for the static models of FIGS. 4.1-4.3, respectively.

The dynamic data may indicate that certain static models provide a better representation of the oilfield. A static model's ability to match historical production rate data may be considered a good indication that it may also give accurate predictions of future production. Accordingly, a static model may be selected. For example, while the static model of FIG. 4.3 may have the highest overall probability of accuracy based solely on the static model as shown in FIG. 5, an analysis of the dynamic model suggests that model of FIG. 4.2 is a better match. As shown in FIG. 4.1-4.3, a comparison of layers (306.1) with layers (306.1'), (306.1") and (306.1''') indicates that fault (307) with associated fluid transmissibility across the fault most closely matches the prediction provided by static model (402.2).

In this example, the selected static model (402.2) is modified based on the dynamic data. The resulting adjusted model (402.2') has been adjusted to better match the production data. As shown, the position of the geological structure (306.1) has been shifted to (306.1") to account for the differences shown by the dynamic data. As a result, the static model may be adapted to better fit both the static and dynamic models.

In determining the best overall model, the static and/or dynamic data may be considered. In this case, when considering both the static and dynamic data, the static model (402.2) of FIG. 4.2 is selected as the earth model with the highest probability of accuracy based on both the static probabilities and dynamic input. To obtain the best overall model, it may be desirable to consider the static and dynamic data from multiple sources, locations, and/or types of data.

The evaluation of the various static and dynamic data of FIG. 3 involves considerations of static data, such as seismic data (308.1) considered by a geophysicist, geological data (308.2, 308.3) considered by a geologist, and production data (308.4) considered by a reservoir engineer. Each individual typically considers data relating to a specific function and provides models based on this specific function. However, as depicted in FIGS. 4.1-4.3, information from each of the separate models may affect the decision on the best overall model. Moreover, information from other models or sources may also affect adjustments to the model and/or selection of the best overall earth model. The earth model generated as described in FIGS. 4.1-5 is a basic earth model determined from an analysis of the various models provided.

Another source of information that may affect the model(s) is economic information. Throughout the oilfield operations depicted in FIGS. 1.1-1.4, there are numerous business considerations. For example, the equipment used in each of these figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment, accuracy and sensitivity of the measurement tools, data representations, and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation, rate of production, type of equipment, and other factors that will affect the costs and risks associated with the oilfield operation.

Figure 6:
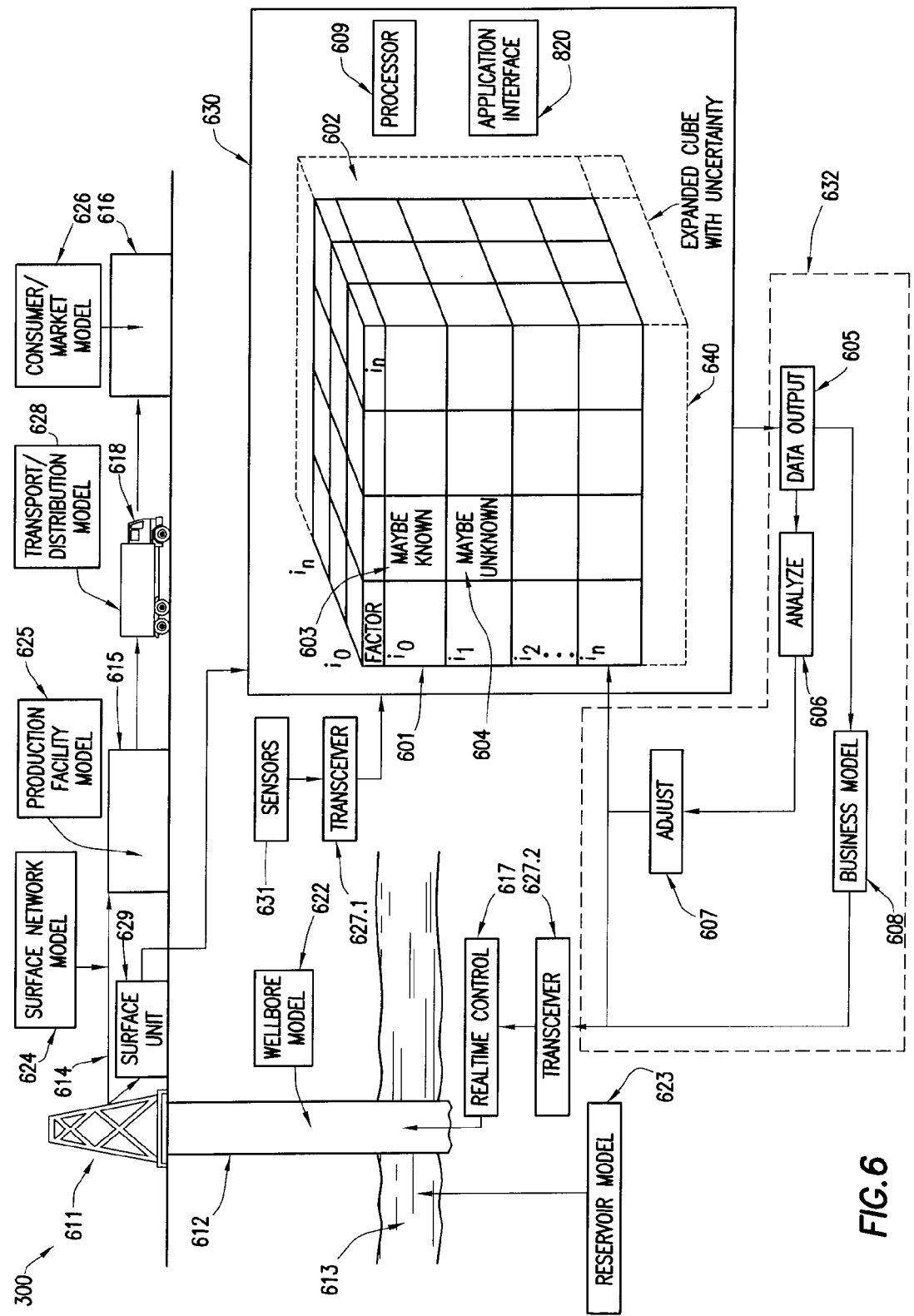
FIG. 6 depicts a schematic view of a portion of the oilfield of FIG. 3 in relation to distribution, consumption, and other commercial activities in accordance with one or more embodiments.

FIG. 6 depicts a schematic view of a portion of the oilfield (300) of FIG. 3. An oilfield evaluation tool (630) and a workflow (632) are provided for performing oilfield operations, which may include planning, development, production, distribution, consumption, and other commercial activities. The oilfield operation may also include preparing forecast of the development and/or production activities. As shown in FIG. 6, the oilfield operations may be related to at least a portion of a wellsite (611), surface network (614), production facility (615), transport/distribution system (618), and consumer/market (616).

An example of the workflow (632) may be a field development planning (FDP) workflow. The FDP workflow is the process used by an energy and petroleum company at various stages of field life to (a) estimate a project's commercial success by developing and assessing strategies for optimum exploitation of oil and gas resources when little physical information is available and (b) make decisions such as increase capacity of facilities or implement a secondary recovery solution. In the current climate FDP activities are beginning earlier, such as in the early stages of exploration and appraisal; being employed in re-development of existing assets; and in some cases can continue throughout the entire life of a field. With the increasing complexity of new field developments and increasing shortage of manpower, the energy and petroleum business needs a decision-driven, as opposed to data-driven, approach to FDP. The FDP workflow is being used to accomplish (a) doing the correct level of work at the appropriate time to answer the right questions and (b) analyzing uncertainty in order to determine which will modify a development decision versus merely impact profitability. During the early stages of investment appraisal, speed of evaluation and the ability to assess all possible sources of risk and uncertainty are crucial and significantly outweigh the requirements for model accuracy.

FIG. 6 depicts a wellsite (611) with a surface unit (629), surface network (614), production facility (615), transport/distribution system (618), and consumer/market (616). The surface unit (629) may be, for example, similar to the surface unit (134) of FIGS. 1.1-1.4.

The wellsite (611) may have a wellbore (612) extending into the earth therebelow for accessing reservoir (613). The wellbore (612) may be configured with real-time control equipment (617). Although the wellbore (612) is shown as already drilled, completed, and ready for production, a multidimensional data repository may be applied to any oilfield and/or wellsite in other phases of oilfield operations, such as exploration, evaluation, development, post-production, and other phases. Said in another way, the wellsite (611) may be any of the survey system, drilling system, wellbore logging system and production system depicted in FIGS. 1.1-1.4.

As depicted in FIG. 6, sensors (631) are disposed about the oilfield (300) to monitor various parameters during oilfield operations. The sensors (631) may measure, for example, pressure, temperature, flow rate, composition, and other parameters of the reservoir, wellbore, surface network, process facilities and/or other portions (or regions) of the oilfield operation. These sensors (631) are operatively connected to the oilfield evaluation tool (630) via transceivers (627.1) for collecting data therefrom. The sensors (631) may be, for example, similar to the sensors (S) of FIGS. 1.1-1.4.

One or more oilfield evaluation tools (e.g., the oilfield evaluation tool (630)) may be located at the oilfield (300), or linked remotely thereto. The oilfield evaluation tool (630) is operatively linked to the surface unit (629) and may reside in the surface unit (629). The oilfield evaluation tool (630) may be a single unit, or a complex network of units used to perform the necessary modeling/planning/management functions throughout the oilfield (300) and related distribution, consumption, and commercial activities. The oilfield evaluation tool (630) may be a manual or automatic system. The oilfield evaluation tool (630) may be operated and/or adjusted by a user. The oilfield evaluation tool (630) is adapted, directly or via the surface unit (629), to receive/store data communicate with various equipment in the oilfield (300), and to send command signals to the oilfield (300) in response to data received or modeling performed. For example, the wellsite (611), the real-time control equipment (617), the surface network (614), the transport/distribution system (618), and contract/pricing relating to consumer (616) may be adjusted and/or optimized based on modeling results updated according to changing parameters throughout the oilfield and related activities, such as subsurface parameters, engineering parameters, economic parameters, commercial parameters, etc.

As further depicted in FIG. 6, the oilfield evaluation tool (630) has computer facilities, such as a processor (609), an application interface (820), and a multidimensional data repository (601), for performing analysis and managing data. Data may be oilfield data collected using the sensors (631), historical data from prior oilfield operations, model data sets, or other oilfield related data such as risk checklist, contracts, commercial data, political data, environmental data, fiscal/financial data, etc. Model data sets may include static or dynamic models (e.g., a simple well performance model) generated from gathered data. Model data sets may include deterministic model and/or probabilistic models. Model data sets may also include representations of probable scenarios, created using the same input data (predicted, historical and/or real time) but having differing interpretation, interpolation, and modeling techniques as shown in FIG. 3 above.

Data may be processed by a processor (609) of the oilfield evaluation tool (630) for analysis. The analyzed data (e.g., based on modeling performed) may then be used to make decisions in the workflow (632) (e.g., FDP workflow). The workflow (632) may include workflow components such as accessing data (605) from the multidimensional data repository (601), performing analysis (606) using the data (605), and adjusting (607) the multidimensional data repository (601) based on the analysis (606). Different driving factors of a decision may dictate different portions of the multidimensional data repository (601) being queried for appropriate data.

In one example, a certain portion (603) of the multidimensional data repository (601) may be populated with known data accessible by the query. In another example, another portion (604) of the multidimensional data repository (601) may include vacant locations to be populated in response to queries associated with the decisions. These unknown data locations may be populated based on estimates or probabilistic simulations using a variety of techniques (e.g., Monte Carlo techniques). In still another example, the multidimensional data repository (601) may be expanded to include new locations (602) to satisfy the queries required by the decisions. The adjustment of the multidimensional data repository (601), for example populating a vacant location or adding a new location, may be initiated as a result of the analysis.

Once the workflow iteration produces a satisfactory result, a business model (608), including an estimation of the value of possible, probable and proven reserves, may be used to manage the oilfield operations based on the result. The transceiver (627.1) may be provided to allow communications between the surface unit (629) and the oilfield (300), for example with the sensors (631). The workflow (632) may be used to actuate mechanisms (e.g., the real-time control equipment (617)) at the oilfield (300) via the transceiver (627.2) based on these decisions. In this manner, the oilfield (300) may be selectively adjusted based on the data collected and analysis performed. These adjustments may be made automatically (based on automated computer protocols) and/or manually by an operator. In some cases, well plans are adjusted to select optimum operating conditions and/or to avoid problems.

To facilitate the processing and analysis of data, simulators and other modeling techniques may be used to process data and generate model data sets for modeling various aspects of the oilfield operation. Specific types of simulators are often used in connection with specific oilfield operations, such as reservoir or wellbore simulation. Additional details regarding using simulators for modeling portions of the oilfield and linking multiple simulators as an integrated asset model for modeling integrated oilfield operations therebetween can be found in U.S. patent application Ser. No. 11/929,921, entitled "System and Method For Performing Oilfield Simulation Operations," which is incorporated herein by reference in its entirety.

The model data sets generated by these oilfield simulators may be stored in different locations in the multidimensional data repository (601) and may be categorized into model types such as a subsurface model data set (e.g., models of geological features interpreted from seismic survey such as the reservoir model (623)), an engineering model data set (e.g., models of fluid flow and thermodynamics in reservoirs, flow lines, and facilities such as a reservoir model (623), a wellbore model (622), a surface network model (624), and a production facility model (625)), an economic model data set (e.g., models of cash flow, taxation, or production sharing agreements), and a commercial model data set (e.g., models of political risk, finance, and contract such as a transport/distribution model (628) and a consumer/market model (626)). As shown, some of the model data sets may be separate or combined, depending on the available simulators. Various combinations of these and other model data sets may be provided.

The model data sets for each different model type category may differ in level of detail and accuracy. The level of detail for a model data set may be based on data available and/or desired modeling speed. The accuracy of a model data set may be based on the types of measurements available, quality of data, and/or capabilities of the simulators or other modeling techniques. For example, the engineering model data sets are typically detailed models requiring many data inputs and computing resources in an attempt to estimate physical systems as accurately as possible. One or more different simulators may be used to generate engineering models with various levels of approximation in mathematical representation. Examples of these engineering models may include: 1) a full reservoir model with increased accuracy, but reduced speed; 2) a tank model proxy of a reservoir simulator, which is less accurate, but faster to solve; and 3) a lookup table proxy of a reservoir simulator, which is typically even more simplified and faster to solve. In contrast, high-level models in the economic and commercial categories typically use fewer inputs and produce a coarse estimation of the physical world. Different levels of model detail/accuracy may be appropriate at different phases or workflow steps of the oilfield operation depending upon the driving factors of the decisions to be made.

Figure 7:
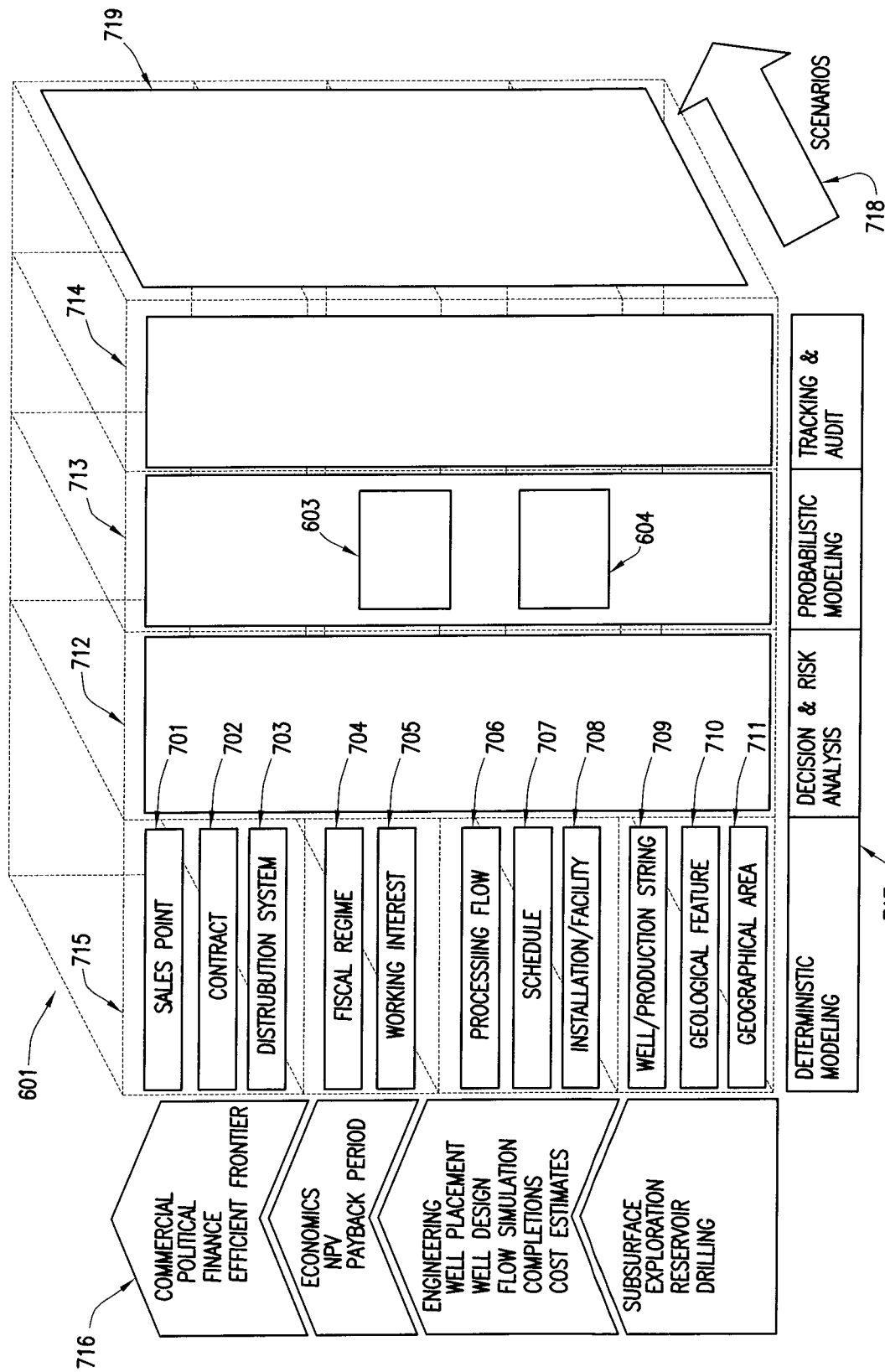
FIG. 7 depicts a schematic view of an example multidimensional data repository for storing oilfield data and model data sets in accordance with one or more embodiments.

FIG. 7 depicts a schematic view of the example multidimensional data repository (601) of FIG. 6 for storing oilfield data and model data sets. A multidimensional data repository (601) comprises multiple locations such as locations (603), (604), and (701)-(711). Each of these locations may be identified and accessed using coordinates based on multiple dimensions.

The example shown in FIG. 6 has three dimensions. The horizontal dimension (717) along the X-axis may represent one aspect of categorizing the oilfield data or model data sets into categories, such as deterministic modeling, decision/risk analysis, probabilistic modeling, and tracking/audit. The first column (715) corresponds to deterministic modeling and may be allocated for storing model data sets generated based on deterministic modeling techniques (e.g., analytical algorithm).

The second column (712) corresponds to decision/risk analysis and may be allocated for storing data associated with decision/risk analysis. Decisions related to oilfield operations may be optimized considering risks associated with uncertainties in the oilfield. More details in optimizing oilfield operations considering physical and/or economic uncertainties can be found in U.S. patent application Ser. No. 11/929,921, entitled "System and Method For Performing Oilfield Simulation Operations," which is incorporated herein by reference in its entirety.

The third column (713) corresponds to probabilistic modeling and may be allocated for storing model data sets generated based on probabilistic modeling techniques (e.g., Monte-Carlo method, probability distribution function, etc.).

The fourth column (714) corresponds to tracking/audit and may be allocated for storing oilfield data relating to audit trail, archives, and project history including revisions to reserves.

Although the horizontal dimension (717) along the X-axis of the example multidimensional data repository (601) is shown to have four categories, other examples may involve any number of categories. Optionally, any of the columns (712)-(715) may include further divided subcategories not shown in FIG. 7.

Further as depicted in FIG. 7, the vertical dimension (716) along the Y-axis may represent another aspect of categorizing the oilfield data or model data sets into categories, such as subsurface, engineering, economics, and commercial. In general, the subsurface category relates to exploration, reservoir, drilling, and other underground activities. The engineering category relates to well placement, well design, flow simulation, completion, cost estimates, and other technical activities. The economics category relates to net present value calculation, payback analysis, valuation of reserves, and other economic aspects of the oilfield operations. The commercial category relates to political, financial, and other commercial aspects of the oilfield operations.

Example oilfield data or model data sets are stored in the first column (715) according to these separate categories. Here, well/production string data (709), geological feature data (710), and geographical area data (711) are stored in the subsurface category. Processing flow data (706), schedule data (707), and installation/facility data (708) are stored in the engineering category. Fiscal regime data (704) and working interest data (705) are stored in the economics category. Sales point data (701), contract data (702), and distribution system data (703) are stored in the commercial category. As described above, any of these data sets (701)-(711) may be gathered data or generated model data set. Although only the first column (715) is shown in FIG. 7 to contain multiple locations along the Y-axis, any of the remaining columns (712)-(714) may also contain multiple locations that are not explicitly shown in FIG. 7.

Furthermore, the scenario dimension (718) along Z-axis may represent different scenarios for "what if" analysis used in decision-making. For each given "what if" scenario, an X-Y layer of locations in a multidimensional data repository (601) may be allocated to store oilfield data or model data set, as described above. With each new scenario given for analysis, a multidimensional data repository (601) may be expanded with an additional X-Y layer of locations. Certain locations in this expanded layer may be populated using data already available in a multidimensional data repository (601). Other vacant locations may be populated with additional data to be gathered or generated. As analyzed scenarios accumulate expanded X-Y layers in a multidimensional data repository (601), each of the columns (e.g., 712-715) expands into a layer along a planar direction such as the plane (719).

Although the example shown in FIG. 7 has only three dimensions, a multidimensional data repository may be practiced with additional dimensions, such as the standard measurement dimension (e.g., representing standard outcome values), the uncertainty dimension (e.g., representing probabilistic data values), the time dimension (e.g., representing effects of scheduling), the look back dimension (e.g., representing data versioning), and additional dimensional analysis supported by data attributes such as geography, project type, reserves category, etc.

Figure 8:
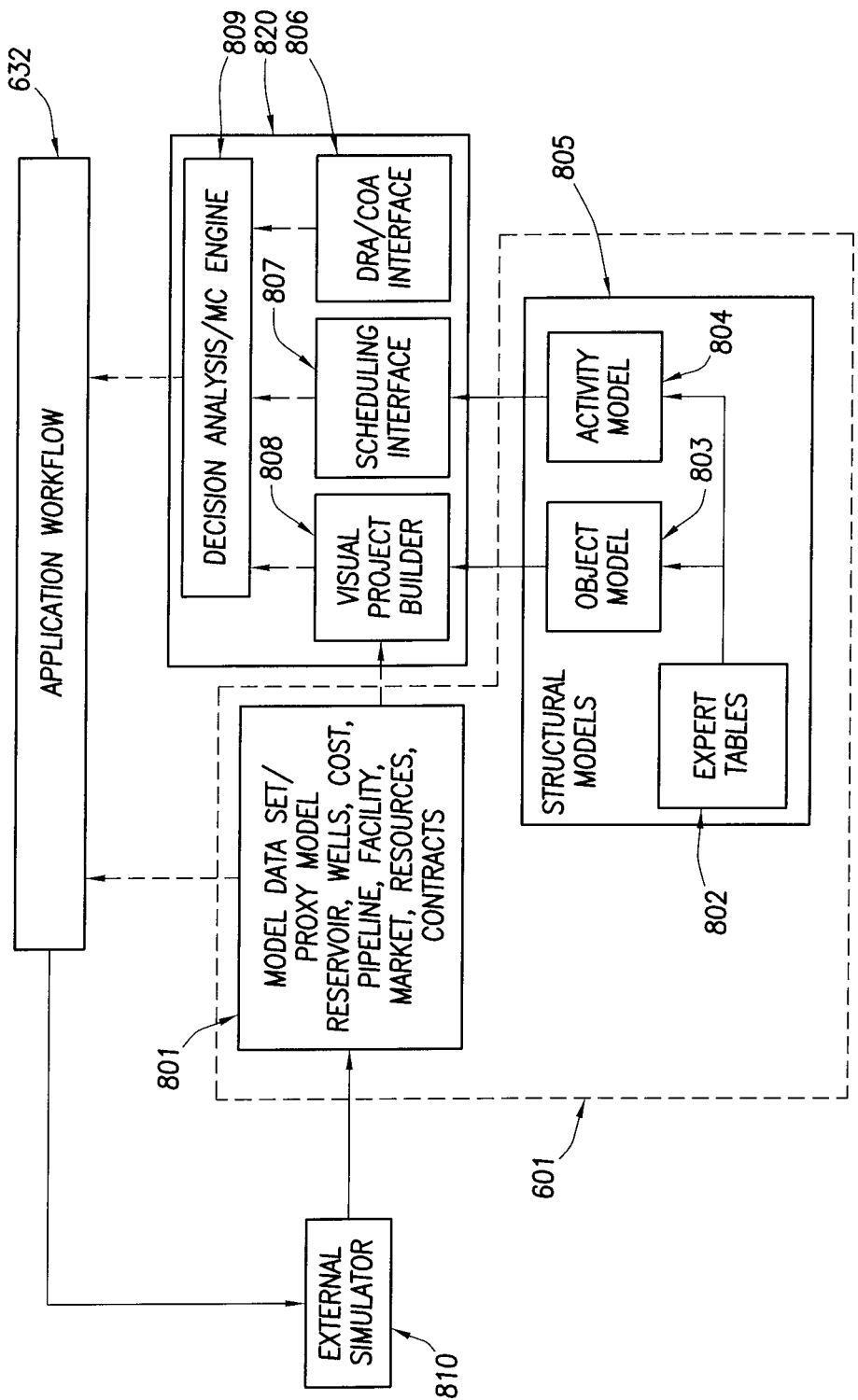
FIG. 8 depicts a schematic block diagram of a system for performing oilfield operations using a multidimensional data repository in accordance with one or more embodiments.

FIG. 8 is a schematic block diagram of a system for performing oilfield operations using a multidimensional data repository (601). In this example, model data sets (e.g., subsurface model, engineering model, economics model, and commercial model) (801) and the structural models (e.g., object models of oilfield objects such as wellsite, surface network, etc. and activity models such as drilling, injection, etc.) (805) are stored in the multidimensional data repository (601).

The model data sets (801) may include static model(s) and/or dynamic model(s) (e.g., as described in FIGS. 4 and 5 above), model data generated from external simulators, or proxy models emulating detailed external simulators. Other data gathered from the oilfield or historical data (e.g., stored in the fourth column (714) of FIG. 7 for tracking/audit) may also be stored in the multidimensional data repository (601). Expert tables (802) may supplement the structural models (805) by acting as a knowledge database using the historical data. For example, budget and schedule information from prior projects and/or decisions may be stored in the expert table (802) and be queried relating to oilfield project based on the object model (803) and/or the activity model (804). Although the expert tables (802) are shown to be included in the structural models (805), it may also be included or configured differently in the multidimensional data repository (601). A model manager (not shown) may also be included in the multidimensional data repository (601) for organizing the various models.

Also shown in FIG. 8, the application interface (820) provides access to the multidimensional data repository (601) for user application (e.g., the workflow (632) of FIG. 6, such as a FDP workflow) to perform various analysis of the oilfield, as depicted in FIG. 6. The workflow (632) may perform analysis in multiple iterations as depicted in FIG. 6. More detail of the workflow iteration is described in the method elements of FIG. 9 below.

A workflow iteration may invoke an oilfield application external to the multidimensional data repository (601) such as the external simulator (810) to generate an additional model data set or proxy model to expand the multidimensional data repository (601) for subsequent workflow iterations. Once the workflow iterations produce satisfactory results, the various analyses may provide economics and/or financial projections of the oilfield operations. The application interface (820) may include visual project builder (808) for constructing an oilfield project to be modeled using object models (803) of oilfield objects, scheduling interface (807) for scheduling the oilfield project based on the activity model (804), analysis interface (806) for performing analysis such as decision/risk analysis (DRA) and/or course of action analysis (COA), and decision analysis/Monte Carlo (MC) engine (809) for performing probabilistic modeling.

Figure 9:
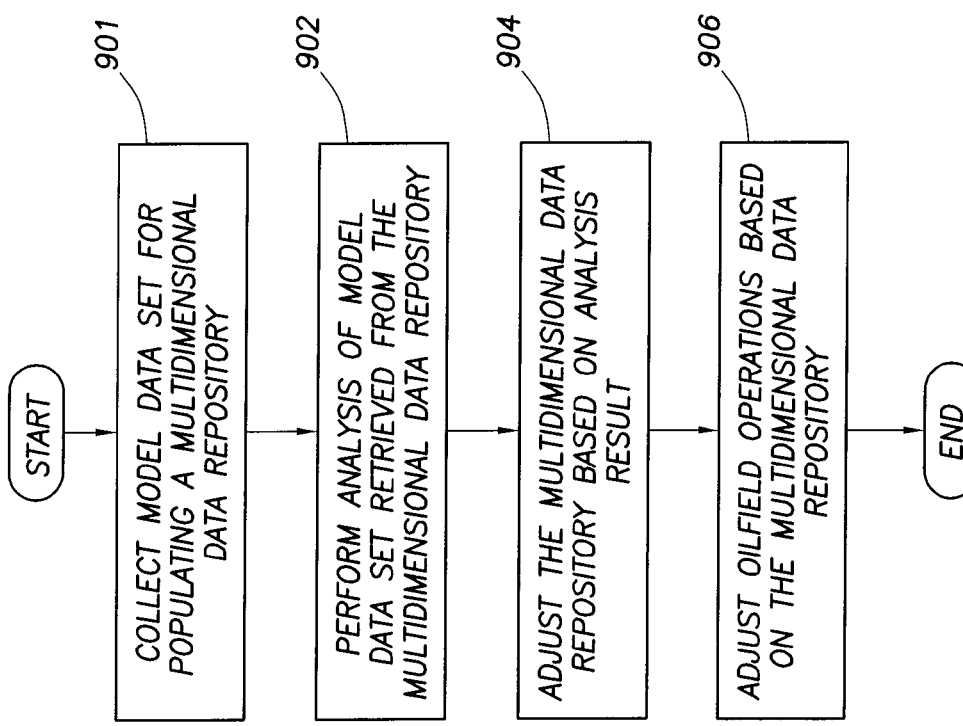
FIG. 9 depicts a flowchart depicting a method for performing oilfield operations using a multidimensional data repository in accordance with one or more embodiments.

FIG. 9 depicts a flowchart of a method for performing oilfield operations using a multidimensional data repository. The method may be iterated to perform the workflow (632), as shown in FIG. 6 above. Initially, a multidimensional data repository is populated using model data set collected from the oilfield (Element 901). For example, the multidimensional data repository (601) of FIG. 6 may be used. A model data set may be stored in a location of the multidimensional data repository and accessed (e.g., reading, writing, modifying, and/or deleting) using coordinates based on multiple dimensions, each dimension representing an aspect for categorizing the oilfield data or model data sets. An example of multiple dimension representation of oilfield data or model data sets is described in reference to FIG. 7 above. The access may be based on a request to make a decision for the oilfield operation. Accordingly, analysis may be selectively performed using the model data set (Element 902). The analysis may pertain to a "what if" scenario of the requested decision.

A multidimensional data repository may be adjusted based on an analysis result (Element 904). Depending on the requirement of the scenario, a vacant location of the multidimensional data repository may be optionally populated or a new location may be optionally created as a result of analysis. The analysis may invoke an oilfield application external to the multidimensional data repository (e.g., an external simulator) to generate a new model data set to populate the vacant location or the new location. The analysis may also cause a high-level proxy model to be invoked or constructed to substitute/emulate a detailed external simulator to meet the timing requirements of the given scenario analysis. The proxy model may populate the vacant location or the new location. The method may then be performed in a subsequent workflow iteration using the now expanded data repository.

Using the workflow iterations, the oilfield operations may be adjusted based on the multidimensional data repository (Element 906). For example, any of the survey operation, drilling operation, logging operation, production operation, operations relating to the surface network, production facility, transport/distribution system, consumer/market system, etc. may be adjusted.

The steps of the method in FIG. 9 are depicted in a specific order. However, it will be appreciated that the steps may be performed simultaneously or in a different order or sequence.

Figure 10:
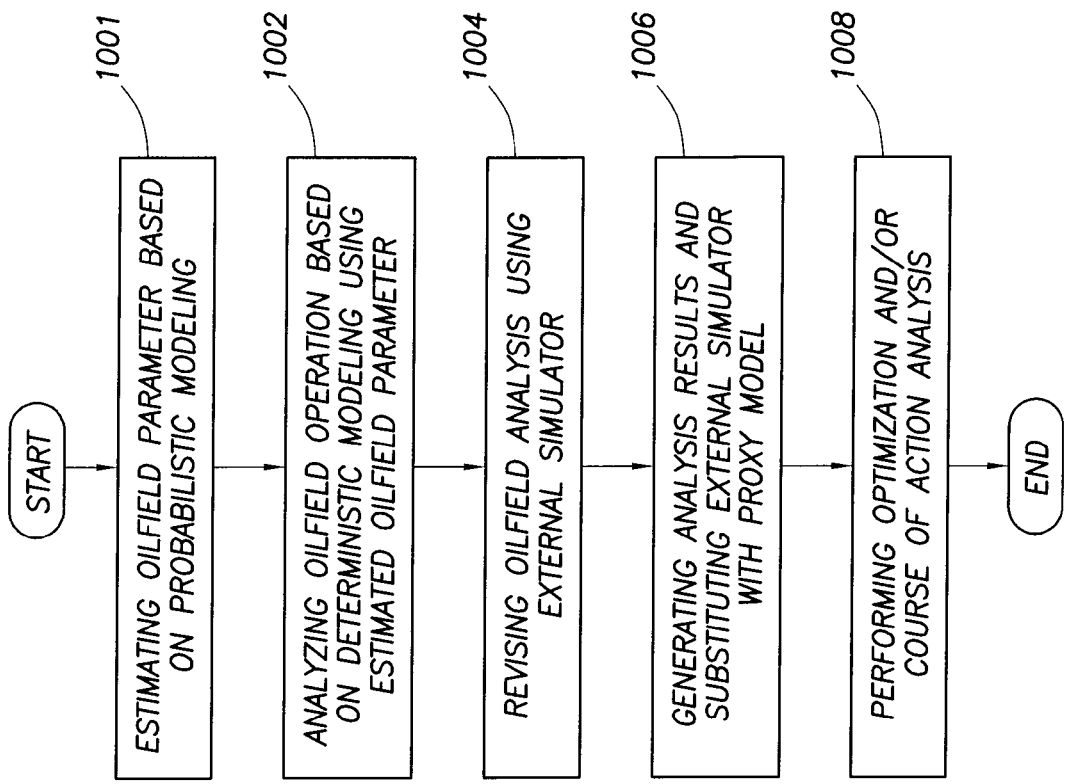
FIG. 10 depicts a flowchart depicting an example workflow for performing oilfield operations using a multidimensional data repository in accordance with one or more embodiments.

FIG. 10 depicts a flowchart of an example workflow (e.g., workflow (632) of FIG. 6, such as a FDP workflow) for performing oilfield operations using a multidimensional data repository. In one or more embodiments of the workflow, a model data set can be as simple as possible and may be built with very little additional data than that used in normal day-to-day analysis of an oilfield. In some cases, the model data set may be chosen to be more complex or less complex, as required by the scenario under analysis to facilitate either detailed analysis of particular engineering issues or a less detailed exploration of multiple scenarios.

The workflow (e.g., FDP workflow) may be used in particular to explore or determine which portion of the overall value chain has the most significant economic impact or poses the greatest risk to the success of the venture. Additionally the workflow and system provides a collaboration tool to facilitate cross-discipline discussion. For example, the workflow application may allow cross-discipline workgroups to agree to the problem to be solved, to gather necessary inputs and set up the model data set in the multidimensional data repository, to facilitate peer and management review, to gain insight into the problem, to manage and control the data and algorithms that are used for the analysis by expert practitioner, to ensure that data are correctly captured and that fit-for-purpose simulation routines are employed at each stage of the problem solving process, to highlight where additional engineering studies may be valuable using decision analysis tools (e.g., value of information, value of flexibility, etc.), to capture and archive the decision made for future reference and learning, to perform further data and model update to exchange for either more sophisticated or more simplified algorithms, and/or to reuse data where possible and highlight data deficiency potentially impacting the validity of the models employed. Accordingly, model data sets can be updated, scenario snapshots saved and outcomes compared against previous results. A variety of optimization tools and simulation engines (e.g., Linear Program optimizers, Monte-Carlo, Course of Action, etc.) can be applied to the model and data in the multidimensional data repository. Typically, higher level (i.e., less detailed or more simplified) model components may be used for optimization based on timing requirements.

As shown in FIG. 10, initially an oilfield parameter may be estimated based on probabilistic modeling (Element 1001). For example, basic data may be entered into the multidimensional data repository to describe a prospect under evaluation. Basic data may include subsurface parameters, engineering parameters, and risk/uncertainty parameters. Subsurface parameters relating to simple well performance models may be entered (e.g., into locations (709)-(711) of FIG. 7) to calculate time series production forecast for the anticipated life of the well or field. A provisional set of engineering parameters (such as drilling start date, time to first production and number of rigs available) may be entered (e.g., into locations (706)-(708) of FIG. 7) so that the overall field production profile can be estimated. Risk/uncertainty parameters may be entered (e.g., into location (712) of FIG. 7) to describe the uncertainty surrounding the amount of oil (or other fluid) that can be extracted from the prospect (e.g., the reserves of a reservoir or field). Probabilistic modeling, for example a Monte-Carlo simulation may then drive the models in the multidimensional data repository to estimate the oilfield parameter, such as the likely best and worst case outcomes (e.g., costs, production profiles, etc.), from combinations of the parameters.

Following a favorable outcome of Element 1001, the multidimensional data repository may be expanded to include deterministic models such as a conceptual development plan and costing (e.g., (704)-(708) of FIG. 7). The oilfield operations may be analyzed (Element 1002) based on deterministic modeling using estimated parameters from Element 1001. For example, the costs are used together with the estimated production profiles and sales price in calculating cash flow forecast for the prospect. Accordingly, the Element 1002 is performed as an iteration of the method of FIG. 9 for the workflow (632) (e.g., FDP workflow). During this iteration, the uncertainty parameters relating to the probabilistic modeling are dormant, and representative outcomes from the previous elements are used to evaluate most likely, best, and worst-case scenarios. The risk/uncertainty parameters entered in the previous elements remains available should it be required in subsequent iterations. Links may be established to the corporate reserves and financial systems and the asset team (e.g., formed from cross discipline work groups) can decide whether the resulting forecast data be made available to a corporate planning group should they need to use it for their purposes. Additionally, a copy of the working model is preserved (e.g., in (714) of FIG. 7) for future reference.

Further, as shown in FIG. 10, sensitivity analysis of the project economics may be performed using the multidimensional data repository. Therefore, another iteration (Element 1004) of the method of FIG. 9 may be performed for the workflow (632). During the sensitivity analysis it may be determined that a more detailed external flow network simulation is more appropriate to model the uncertainties of an existing facility (Element 1004). The uncertainty parameters and Monte-Carlo simulation may then be re-engaged in order to investigate the full range of flow configurations. Data may be passed over to an external system for the flow analysis to be performed and outputs returned. The economics analysis may be performed again using the output from the detailed simulation and data from this external analysis may be captured (e.g., in (714) of FIG. 7) for future use.

As an example, further sensitivity analysis, combined with the potential faulted nature of the reservoir may justify a reservoir fluid simulation study using another detailed external simulator to predict the production profile more accurately and to determine the best drilling schedule. This may be accomplished by performing another iteration of the method of FIG. 9 for the workflow (632) in Element 1004. Output from this detailed external reservoir simulator may be used to supersede that from the internal simple well performance models entered in Element 1001 above.

The combined results may then be used in a facilitated collaboration session, for example, conducted via the Internet. The data gathered to this point may be augmented with a description and categorization of the perceived risks of the project. The asset team may reach an agreement on which aspects of the project are "make or break" driving factors and specifically on what questions need to be answered before the project can be put forward for management review and approval. A suitable outline plan may then be formulated for the next stage of modeling, which may involve identifying more favorable contract terms for the company. Tasks may then be delegated to the appropriate disciplines accordingly. Therefore, additional iterations (not shown) of the method of FIG. 9 for the workflow (632) may optionally be performed. Proxy models for the external detailed reservoir and flow network simulations may be set up using system wizards to emulate the detailed simulations over a range of feasible outcomes (Element 1006).

Based on the fast speed of proxy models, the multidimensional data repository may be used for high-level analysis. For example, various options for the sale of the gas product may be outlined together with the expected forward contract prices. An updated risk model may then be constructed to explore the contract parameters that the asset team believe to be negotiable. Using the fast proxy models, it is possible to generate outputs that explore the economic and financial boundaries of substantially all foreseeable outcomes of the project. Goal programming and other optimization methods may be used to select the best negotiating and fall back positions (Element 1008). The plan may be annotated and saved for future use as an audit trail and a knowledge capture mechanism (e.g., (714) of FIG. 7).

Accordingly, the impact of uncertainties may be assessed across the whole development planning process and the impact of those uncertainties assessed on different development scenarios. As a result the path taken to decisions may be generally visible and decisions made on a complete or integrated view of a project. Furthermore, optimization engine may be applied on top of a full field model, which allows sufficient assessment of the effects of scheduling. In the multidimensional data repository, data and models may be linked to industry standard physical models. Proxy models, which allow multiple scenario evaluation, may be generated from these industry standard physical models with sufficient clarity on their validity versus well-accepted analytical techniques.

The elements of portions (or all) of the process may be repeated as desired. Repeated elements may be selectively performed until satisfactory results are achieved. For example, elements may be repeated after adjustments are made. This may be done to update the simulation models and/or to determine the impact of changes made.

Figure 11:
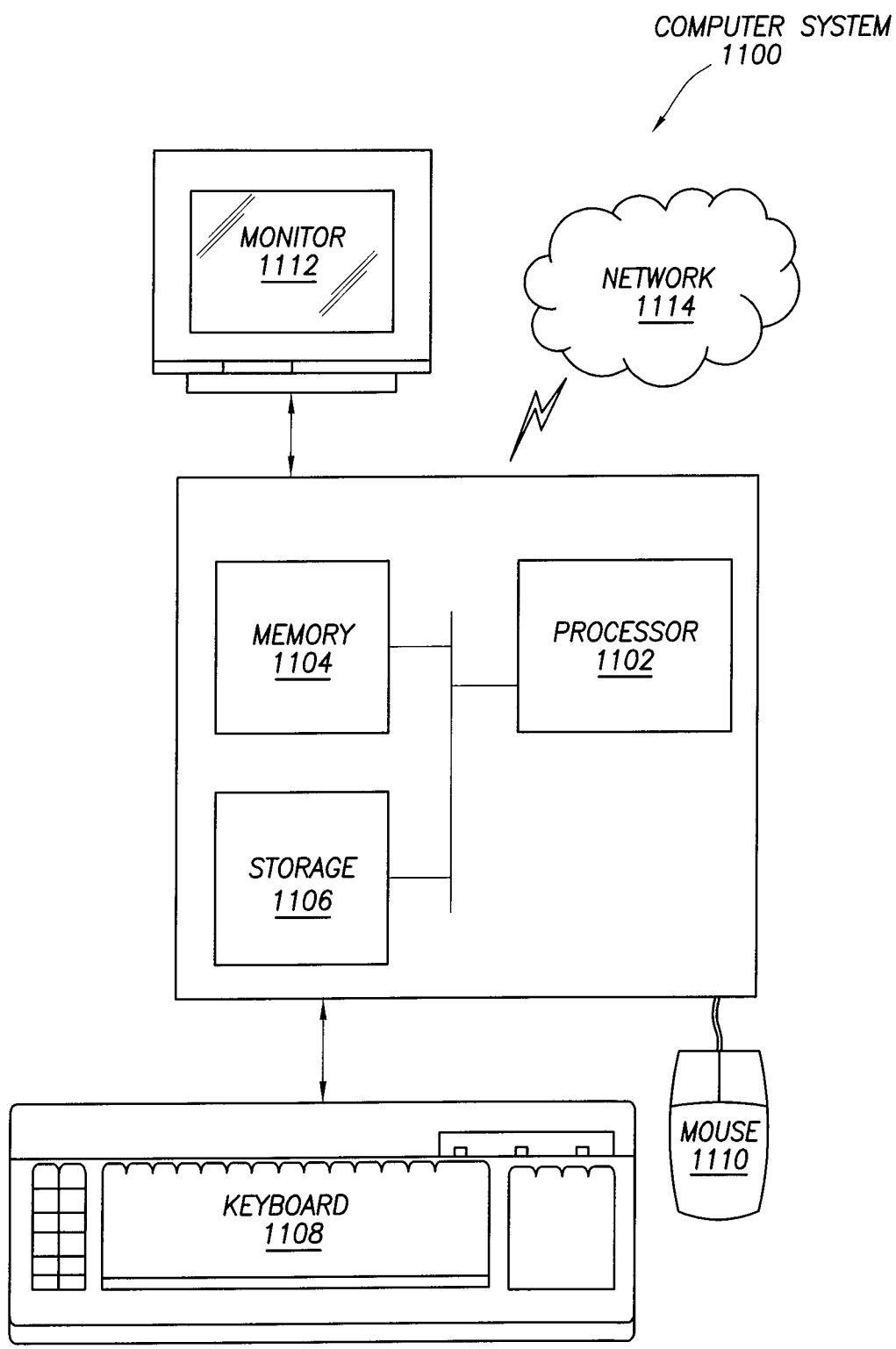
FIG. 11 depicts a computer system in accordance with one or more embodiments.

The steps of the example workflow in FIG. 10 are depicted in a specific order. However, it will be appreciated that the steps may be performed simultaneously or in a different order or sequence. Although a specific example is given for illustration purposes, the invention may be equally applicable to other oilfield applications. For example, it is contemplated that the invention may be applied to address logistical challenges for liquefied natural gas (LNG) related operations. For example, the transport/distribution model (618) depicted in FIG. 6 may be adapted to address such LNG operations with respect to key logistics parameters such as, but not limited to, ship capacity/speed, product loss in transit, berthing water depth required, ship availability, etc Embodiments of a multidimensional data repository may be implemented on virtually any type of computer regardless of the platform being used. For example, as shown in FIG. 11, a computer system (1100) includes one or more processor(s) (1102), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). The computer (1100) may also include input means, such as a keyboard (1108), a mouse (1110), or a microphone (not shown). Further, the computer (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of a multidimensional data repository for modeling oilfield operations.

Further, those skilled in the art will appreciate that one or more elements of the aforementioned computer system (1100) may be located at a remote location and connected to the other elements over a network (1114). Further, embodiments of a multidimensional data repository may be implemented on a distributed system having a plurality of nodes, where each portion of the embodiments (e.g., various modules of FIG. 4) may be located on a different node within the distributed system. In one embodiment, the node corresponds to a computer system. Alternatively, the node may correspond to a processor with associated physical memory. The node may alternatively correspond to a processor with shared memory and/or resources. Further, software instructions for performing embodiments of a multidimensional data repository for modeling oilfield operations may be stored on a computer readable medium such as a compact disc (CD), a diskette, a tape, a file, or any other computer readable storage device. This description is intended for purposes of illustration and should not be construed in a limiting sense.

It will be understood from the foregoing description that various modifications and changes may be made in the embodiments of a multidimensional data repository without departing from its true spirit. For example, the data input, coupling, layout, and constraints defined in a multidimensional data repository provide flexibility to the workflow process. These factors of the various external simulators and/or internal proxy models may be selected to meet the requirements of the scenario for evaluating oilfield operation. Any combination of simulators and/or proxy models may be selectively linked to create the overall oilfield simulation. The process of linking the simulators and/or proxy models may be re-arranged and simulations repeated using different configurations. Depending on the speed, accuracy, or level of detail, the simulators and/or proxy models may be selected to provide the desired results. Various combinations may be evaluated and compared to determine the best outcome. Adjustments to a multidimensional data repository may be made based on the analysis results and other factors. The process may be repeated as desired.

This description is intended for purposes of illustration and should not be construed in a limiting sense. The scope of a multidimensional data repository should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method for performing oilfield operations comprising:
    collecting a model data set from an oilfield for populating a location of a plurality of locations in a multidimensional data repository, the plurality of locations accessible based on a plurality of dimensions of the multidimensional data repository, wherein the plurality of dimensions includes at least first, second and third dimensions, each of which separately categorizing the model data set, wherein the first dimension categorizes the model data set into one of a first plurality of categories, the second dimension categorizes the model data set into one of a second plurality of categories, and the third dimension categorizes the model data set based upon a scenario associated with the model data set;
    performing, using a processor of a computer system, analysis of at least the model data set retrieved from the location of the plurality of locations to generate a result;
    adjusting, using the processor, the multidimensional data repository based on the result;

adjusting the oilfield operations based on the multidimensional data repository; and in response to addition of a new scenario:
expanding the multidimensional data repository along the scenario dimension to include a new set of locations organized along the first and second dimensions;
populating at least a first location in the new set of locations with data already available in the multidimensional data repository;
populating at least a second location in the new set of locations with new data; and
performing analysis for the new scenario using data from at least one of the first and second locations in the new set of locations.

2. The method of claim 1, wherein the plurality of locations are accessible for reading, writing, modifying, and deleting.

3. The method of claim 1, wherein performing analysis comprises selectively performing, based on a pre-determined criteria, at least one selected from a group consisting of probabilistic modeling and deterministic modeling.

4. The method of claim 3, wherein the pre-determined criteria is based on at least one selected from a group consisting of processing time for performing the analysis, computing resources for performing the analysis, accuracy of the result, and sensitivity of the result with respect to an uncertainty parameter.

5. The method of claim 1, further comprising:
revising the analysis to generate an adjusted result using an oilfield application external to the multidimensional data repository;
storing the adjusted result in at least one selected from a group consisting of a vacant location of the plurality of locations and a new location added to the plurality of locations.

6. The method of claim 5, further comprising:
generating a proxy model based on the adjusted result to emulate the oilfield application; and
substituting the oilfield application with the proxy model in the multidimensional data repository.

7. The method of claim 6, further comprising:
storing the proxy model in at least one selected from a group consisting of a vacant location of the plurality of locations and a new location added to the plurality of locations.

8. The method of claim 7, further comprising:
performing at least one selected from a group consisting of optimization and course of action analysis using the proxy model.

9. The method of claim 1, wherein the first dimension categorizes the model data set into one of the first plurality of categories based upon an algorithm associated with the model data set.

10. The method of claim 9, wherein the first plurality of categories includes at least one category selected from the group consisting of deterministic modeling, decision/risk analysis, probabilistic modeling or tracking/audit.

11. The method of claim 1, wherein the second plurality of categories includes at least one category selected from the group consisting of a subsurface category, an engineering category, an economics category or a commercial category.

12. The method of claim 1, wherein the scenario dimension categorizes the model data set into one of a plurality of what if scenarios.

13. The method of claim 1, wherein the plurality of dimensions includes a fourth dimension selected from the group consisting of a standard measurement dimension, an uncertainty dimension, a time dimension, or a look back dimension.

14. A non-transitory computer readable medium, embodying instructions executable by a computer to perform oilfield operations, the instructions when executed by the computer comprising functionality for:
collecting a model data set from an oilfield for populating a location of a plurality of locations in a multidimensional data repository, the plurality of locations accessible based on a plurality of dimensions of the multidimensional data repository, wherein the plurality of dimensions includes at least first, second and third dimensions, each of which separately categorizing the model data set, wherein the first dimension categorizes the model data set into one of a first plurality of categories, the second dimension categorizes the model data set into one of a second plurality of categories, and the third dimension categorizes the model data set based upon a scenario associated with the model data set;
performing analysis of at least the model data set retrieved from the location of the plurality of locations to generate a result;
revising the analysis to generate an adjusted result using an oilfield application external to the multidimensional data repository;
adjusting the multidimensional data repository based on the adjusted result;
adjusting the oilfield operations based on the multidimensional data repository; and
in response to addition of a new scenario:
expanding the multidimensional data repository along the scenario dimension to include a new set of locations organized along the first and second dimensions;
populating at least a first location in the new set of locations with data already available in the multidimensional data repository;
populating at least a second location in the new set of locations with new data; and
performing analysis for the new scenario using data from at least one of the first and second locations in the new set of locations.

15. The computer readable medium of claim 14, the instructions when executed by the computer further comprising functionality for:
generating a proxy model based on the adjusted result to emulate the oilfield application; and
substituting the oilfield application with the proxy model in the multidimensional data repository.

16. The computer readable medium of claim 15, the instructions when executed by the computer further comprising functionality for:
storing the proxy model in at least one selected from a group consisting of a vacant location of the plurality of locations and a new location added to the plurality of locations.

17. The computer readable medium of claim 16, the instructions when executed by the computer further comprising functionality for:
performing at least one selected from a group consisting of optimization and course of action analysis using the proxy model.

18. The computer readable medium of claim 14, wherein performing analysis comprises selectively performing, based on a pre-determined criteria, at least one selected from a group consisting of probabilistic modeling and deterministic modeling.

19. The computer readable medium of claim 14, wherein the pre-determined criteria is based on at least one selected from a group consisting of processing time for performing the analysis, computing resources for performing the analysis, accuracy of the result, and sensitivity of the result with respect to an uncertainty parameter.

20. A system for performing oilfield operations comprising:

a processor; and memory storing instructions when executed by the processor comprising functionality for:

collecting a model data set from an oilfield for populating a location of a plurality of locations in a multidimensional data repository, the plurality of locations accessible based on a plurality of dimensions of the multidimensional data repository, wherein the plurality of dimensions includes at least first, second and third dimensions, each of which separately categorizing the model data set, wherein the first dimension categorizes the model data set into one of a first plurality of categories, the second dimension categorizes the model data set into one of a second plurality of categories, and the third dimension categorizes the model data set based upon a scenario associated with the model data set;

performing analysis of at least the model data set retrieved from the location of the plurality of locations to generate a result;

adjusting the multidimensional data repository based on the result;

adjusting the oilfield operations based on the multidimensional data repository; and in response to addition of a new scenario:

expanding the multidimensional data repository along the scenario dimension to include a new set of locations organized along the first and second dimensions;

populating at least a first location in the new set of locations with data already available in the multidimensional data repository;

populating at least a second location in the new set of locations with new data; and performing analysis for the new scenario using data from at least one of the first and second locations in the new set of locations.

21. The system of claim 20, further comprising:

a surface unit comprising the processor and the memory;

sensors disposed about the oilfield and coupled to the surface unit for monitoring parameters during the oilfield operations to generate at least a portion of the model data set; and a real-time control equipment coupled to the surface unit for adjusting the oilfield operations based on the multidimensional data repository.

22. The system of claim 20, wherein performing analysis comprises selectively performing, based on a pre-determined criteria, at least one selected from a group consisting of probabilistic modeling and deterministic modeling, and wherein the pre-determined criteria is based on at least one selected from a group consisting of processing time for performing the analysis, computing resources for performing the analysis, accuracy of the result, and sensitivity of the result with respect to an uncertainty parameter.

23. The system of claim 20, further comprising an oilfield application external to the multidimensional data repository, wherein the instructions when executed by the processor further comprising functionality for:

revising the analysis to generate an adjusted result using the oilfield application external to the multidimensional data repository;

storing the adjusted result in at least one selected from a group consisting of a vacant location of the plurality of locations and a new location added to the plurality of locations.

24. The system of claim 23, wherein the instructions when executed by the processor further comprising functionality for:

generating a proxy model based on the adjusted result to emulate the oilfield application;

storing the proxy model in at least one selected from a group consisting of a vacant location of the plurality of locations and a new location added to the plurality of locations; and performing at least one selected from a group consisting of optimization and course of action analysis using the proxy model.

25. The system of claim 20, further comprising:

at least one system selected from a group consisting of survey system, drilling system, wellbore logging system, production system, surface network, production facility, transport/distribution system, and consumer marketing system, wherein the at least one system is selectively adjusted based on the multidimensional data repository.

* * * * *